United States Patent [19]
Jordan et al.

[11] Patent Number: 4,961,618
[45] Date of Patent: Oct. 9, 1990

[54] OPTICAL COMMUNICATION SYSTEM HAVING A WIDE-CORE SINGLE-MODE PLANAR WAVEGUIDE

[75] Inventors: Arthur K. Jordan, Alexandria, Va.; S. Lakshmanasamy, Dallas, Tex.

[73] Assignee: The United States of America as represented by the Secretary of the Navy, Washington, D.C.

[21] Appl. No.: 361,078

[22] Filed: Jun. 5, 1989

[51] Int. Cl.$^5$ .............................................. G02B 6/10
[52] U.S. Cl. ............................... 350/96.12; 350/96.15
[58] Field of Search ............... 350/96.12, 96.13, 96.14, 350/96.15

[56] References Cited

U.S. PATENT DOCUMENTS

| | | | |
|---|---|---|---|
| H.77 | 7/1986 | Yao et al. | 350/96.12 |
| 3,833,435 | 9/1974 | Logan et al. | 350/96.12 X |
| 3,903,488 | 9/1975 | Fong | 350/96.12 X |
| 4,368,543 | 1/1983 | Hasegawa | 455/612 |
| 4,463,330 | 7/1984 | Yoneyama | 333/239 |
| 4,707,058 | 11/1987 | Tolksdorf et al. | 350/96.12 |
| 4,712,855 | 12/1987 | Tolksdorf et al. | 350/96.12 |
| 4,736,620 | 4/1988 | Adolph | 73/35 |
| 4,737,015 | 4/1988 | Ishida et al. | 350/96.34 |
| 4,751,690 | 6/1988 | Krueger | 367/149 |
| 4,841,778 | 6/1989 | Butler et al. | 73/800 |

OTHER PUBLICATIONS

Grand et al. "Optical Polarisers of High Extinction Ratio Integrated on Oxidised Silicon Substrate". *Electronics Letters*, Aug. 30th 1984, vol. 20, No. 18, pp. 730-731.
Article entitled "Design of Waveguide With Prescribed Propagation Constants" by S. P. Yukon et al., pp. 172-179 of Journal Optical Society of America, vol. 70, No. 2, Feb. 1980.

*Primary Examiner*—William L. Sikes
*Assistant Examiner*—Phan T. Heartney
*Attorney, Agent, or Firm*—Thomas E. McDonnell; Elmer E. Goshorn

[57] ABSTRACT

This invention relates to an improved optical communication system having an enhanced wide-core single-mode planar waveguide for transmitting a single-mode light wave in a unique manner. The system is generally made up of light-wave source means, the aforementioned waveguide and receiving means. The waveguide is generally made up of an inhomogeneous wide-core means of block-like configuration and opposed cladding means where one set of opposed sides of the waveguide are provided with the cladding means. The cladding means has a constant permittivity. The core means has an inhomogeneous permittivity profile, a part of which is greater than the cladding means permittivity and another part of which is less than the cladding means permittivity. The analogy of quantum mechanics with optics can provide an algorithm for an equivalent inhomogeneous quantum potential formula of curvilinear shape. This equivalent quantum potential can be computer solved and graphically plotted in relation to a multipole rational function for the transverse reflection coefficient for the intended propagating and radiating modes of the waveguide, all for advantageously determining the width and permittivity profile of the core means. As the result of this width and profile determination, an algorithmic inhomogeneous relative permittivity profile of curvilinear shape of the core means is computer solvable and graphically plottable for indicating the core modal structure and transmission characteristics. One suitable material for the waveguide is LiNbO$_3$ where the core means thereof is provided with a selective amount of Ti dopant.

23 Claims, 4 Drawing Sheets

OPTICAL COMMUNICATION SYSTEM HAVING A WIDE-CORE SINGLE-MODE PLANAR WAVEGUIDE

This invention concerns an optical communication system having a planar waveguide for a single-mode light wave; and, more particularly, it relates to an improved optical communication system having a unique single-mode, wide-core planar waveguide of cladded and composite construction for propagating a single-mode light wave as the result of uniquely using more than one novel algorithmic technique that is based on inverse scattering theory and that analytically determines various design parameters of the waveguide prior to fabrication and use.

BACKGROUND OF THE INVENTION

Various types of waveguides have been designed in the past. For example, U.S. Pat. No. 4,463,330 T. Yoneyama discloses a planar waveguide of composite construction for transmitting a millimeter wave in parallel polarized fashion. The waveguide is generally made up of a core means having both a dielectric medium (air) and a center-strip material. Two opposed sets of layers are provided for covering the core means, the inner set a being dielectric layer, the outer set a conductive layer. U.S. Pat. No. 4,712,855 W. F. M. Tolksdorf et al. concerns a planar one-way optical waveguide of composite integrated construction for removing unwanted radiation modes. The waveguide is generally made up a nonmagnetic substrate, a first radiation absorption layer and two overlying magneto-optic layers that have different refractive indices. U.S. Pat. No. 4,737,015 K. Ishida et al. relates to a planar one-way optical waveguide. The waveguide is generally made up of a substrate, upper and lower cladding layers and a core layer interposed between the cladding layers. During construction of the waveguide at least one of the layers is of oxy-nitride composition. However, none of the aforediscussed references were remotely concerned with an improved optical communication system having an enhanced planar and cladded waveguide for radiating and propagating a single-mode light wave where both the width of the waveguide wide-core means and the inhomogeneous perimitivity profile thereof are analytically determined by novel computer-solvable algorithmic formulas.

SUMMARY OF THE INVENTION

An object of the invention is to provide an improved optical communication system having an enhanced inhomogeneous wide-core planar waveguide for propagating a single-mode light wave that can readily be incorporated into an integrated optical circuit design.

Another object of the invention is to provide an improved wide-core, single-mode planar waveguide preferably of composite and integrated construction and normally formed by appropriate epitaxial techniques.

Still another object of the present invention is to provide an improved planar and cladded wide-core waveguide where the waveguide exhibits an inhomogeneous permittivity profile for enabling propagation of a single-mode light wave longitudinally thereof to receiving means.

And still another object of the invention is to provide an improved planar and cladded waveguide of block-like configuration having inhomogeneous wide-core, single-mode means where one set of opposed sides of the core means are provided with opposed cladding means and where the permittivity of the cladding means is less than a part of the inhomogeneous permittivity profile of the core means and also where the permittivity of the cladding means is greater than another part of the inhomogeneous permittivity profile.

And yet another object of the invention is to provide an improved planar and cladded waveguide having inhomogeneous single-mode, wide-core means where the width and permittivity profile of the core means can be analytically determined by use of a rotational function of the wave number that characterizes the transmission of optical signals through the wide core in conjunction with a computer-solvable equivalent quantum potential formula.

In summary, the improved optical communication system is generally made up of either a coherent or incoherent light-wave source (preferably a laser), coupling means, enhanced planar and cladded single-mode waveguide, and receiving means. The waveguide of block-like configuration and solid construction is provided with inhomogeneous wide-core means such that one set of opposed sides of the core means are cladded with opposed cladding means. The core means advantageously transmits a single-mode light wave when received from the source such that the receiving means is disposed longitudinally thereof. Moreover, the light source, the coupling means, the waveguide the receiving means all readily lend themselves to be incorporated into an integrated optical circuit design.

The inhomogeneous wide-core means of the waveguide is preferably of integrated and composite construction and may be readily formed by appropriate epitaxial techniques. In one reduction to practice a suitable material for the cladded waveguide has been found to be lithium niobate ($LiNbO_3$) where the wide-core means is provided with a predetermined amount of titanium (Ti) diffused therein as a dopant therefor. An equivalent quantum potential is analogous to the permittivity profile of the inhomogeneous core of the cladded waveguide. Further, a rational function of the wave number is representative of the transmission characteristics of the waveguide core means. By use of this rational function in conjunction with the analogous quantum potential function, the quantum potential is computer solvable and graphically plottable so as to enable selective truncation of the solved and plotted formula for advantageously predetermining in a sufficiently accurate both fashion the width and the permittivity profile of the core means.

As will become more apparent hereinafter by use of inverse scattering theory in conjunction with a rational function for the transverse reflection coefficient for the intended wide-core single-mode cladded planar waveguide in conjunction with an equivalent inhomogeneous quantum potential algorithm as well as a permittivity profile algorithm, the predetermined width of the core means can be analytically determined in a sufficiently accurate fashion so as to enable graphic construction of the normalized permittivity difference profile of the core means prior to fabrication and use. To this end and prior to fabrication of the waveguide including its core as well as analytical determination of the core means profile and its width, etc., a given wavelength of the light source to be handled by the core means is required along with appropriate selection of the pole values of the rational function for representing the propagating and radiating modes of the waveguide and the cladding material of the waveguide having a permittivity value less than the maximum value of the analytically determined permittivity profile for the core means.

Other objects and advantages of the invention will become more apparent when taken in conjunction with the accompanying specification and drawings as will now be described.

DETAILED DESCRIPTION OF THE INVENTION

Figure 1:
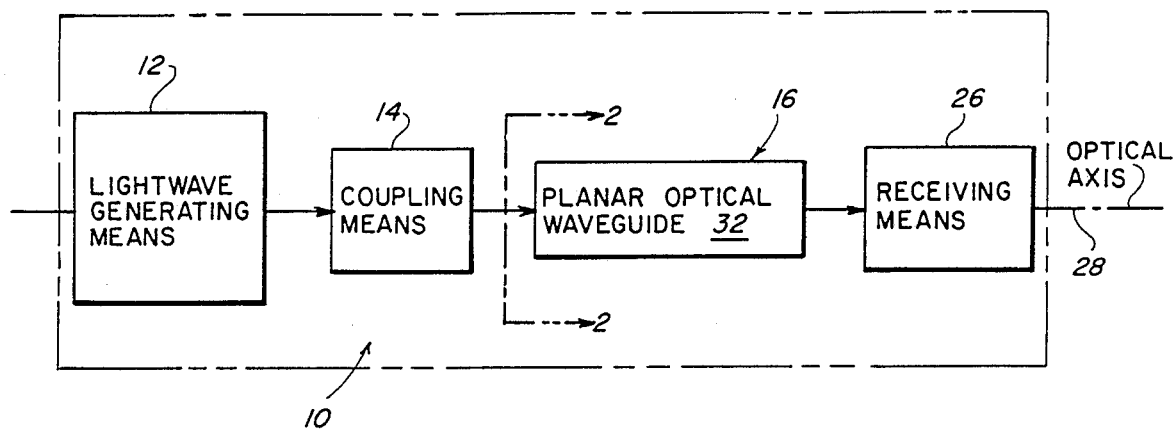
FIG. 1 is a diagrammatic view in dotted and solid lines of an improved optical communication system of the invention for single-mode light wave transmission and further illustrates an enhanced planar optical waveguide of wide-core and cladded construction for effecting continuous single-mode light wave propagation in relation thereto.
Figure 2:
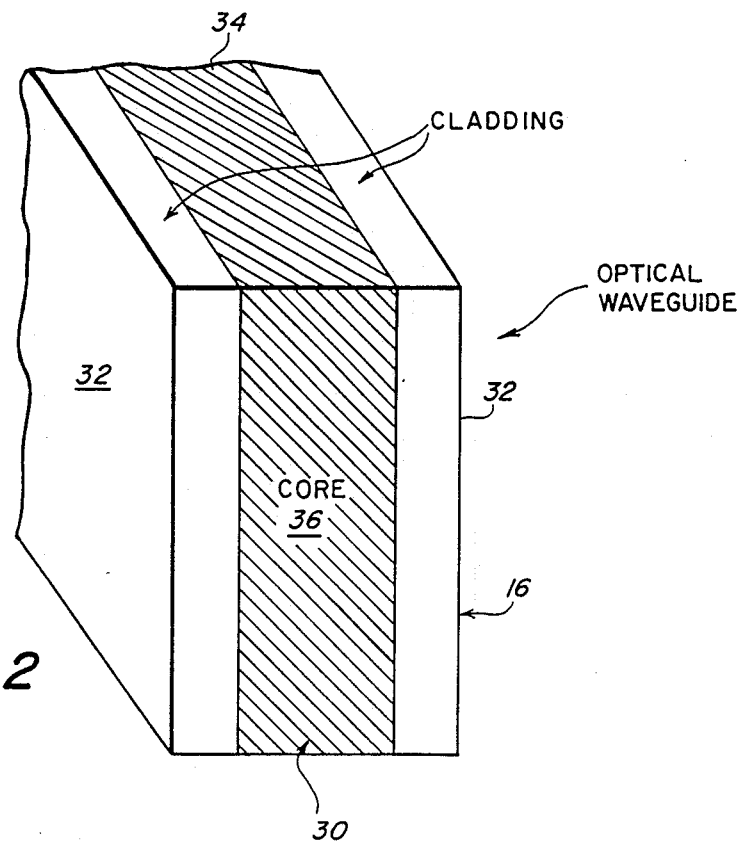
FIG. 2 is an enlarged elevational and perspective view of the optical waveguide of the improved system is taken along line 2—2 of FIG. 1 and with certain system components associated therewith as viewed in FIG. 1 being removed.

With further reference to FIG. 1 an improved optical communication system 10 is generally comprised of single-mode light wave generating means 12 of either coherent or incoherent light, coupling means 14, planar optical waveguide 16 and receiving means 26. The generating means is preferably a laser and provides an output along optical axis 28 to coupling means 14. It is to be understood that the light wave generating means can be in the useful range of the electromagnetic spectrum, e.g., with wavelengths from approximately $10^{-2}$ meters to about $10^{-5}$ meters. Any suitable coupling means can be used and it provides an output to the waveguide. As best shown in FIG. 2, the waveguide is of block-like, solid-shaped configuration and is generally made up of an inhomogeneous core means 30 and opposed cladding means 32. The opposed cladding means are connected to one set of opposed sides of the core means. The other set of opposed sides 34 of the core means have opposed end faces 36 that are exposed. The waveguide is preferably of composite integrated construction such that the waveguide may be formed by appropriate epitaxial techniques. In one reduction to practice a suitable material for the waveguide is lithium niobate ($LiNbO_3$) where the core means is provided with a predetermined amount of titanium (Ti) diffused therein as a dopant therefor. As is evident from FIG. 1 and as will become more apparent hereinafter, the waveguide has a modal structure that provides both radiating and propagating modes such that the receiving means 26 is preferably disposed longitudinally of the waveguide. In order to provide novel radiating and propagating modal structure of the waveguide, the core means has a predetermined width and permittivity profile as advantageously determined by the use of more than one novel algorithmic technique as will now be described.

The transmission of light in the inhomogeneous core means of waveguide 16 is governed by the vector wave equations for both electric and magnetic fields (see, for example, *Theory of Dielectric Optical Waveguides*, D. Marcuse, New York Academic Press, 1972). In general these equations described the transmission of all modes in all directions within the waveguide. For the purposes of this invention, a single mode propagating in the z-direction of FIG. 1 will be obtained; this mode is termed the "propagating mode." In addition other modes are present that travel in the x-direction; these modes are collectively termed "radiating modes." This invention, by specifically including the effects of these radiating modes, has created a more realistic and efficient design for optical waveguides.

From the vector wave equations, an equation that is analogous to the Schrödinger equation of quantum theory can be derived, namely:

$$\frac{d^2}{dx^2}\psi(x, k) + [k^2 - q(x)]\psi(x, k) = 0,$$

where $\psi(x,k)$ is the normalized electric field amplitude, and where k is a spectral variable or in this case the transverse wave number, x is the transverse distance in the core means and q(x) is a permittivity profile function that is analogous to an equivalent quantum potential function or formula in one dimension.

An inhomogeneous potential in quantum mechanics substantially corresponds to a great degree to the permittivity profile of a waveguide for indicating the transverse reflection characteristics thereof. Accordingly, the predetermined width and permittivity profile of the optical waveguide of the invention is obtained by first solving for a novel algorithmic profile function, q(x).

Figure 3:
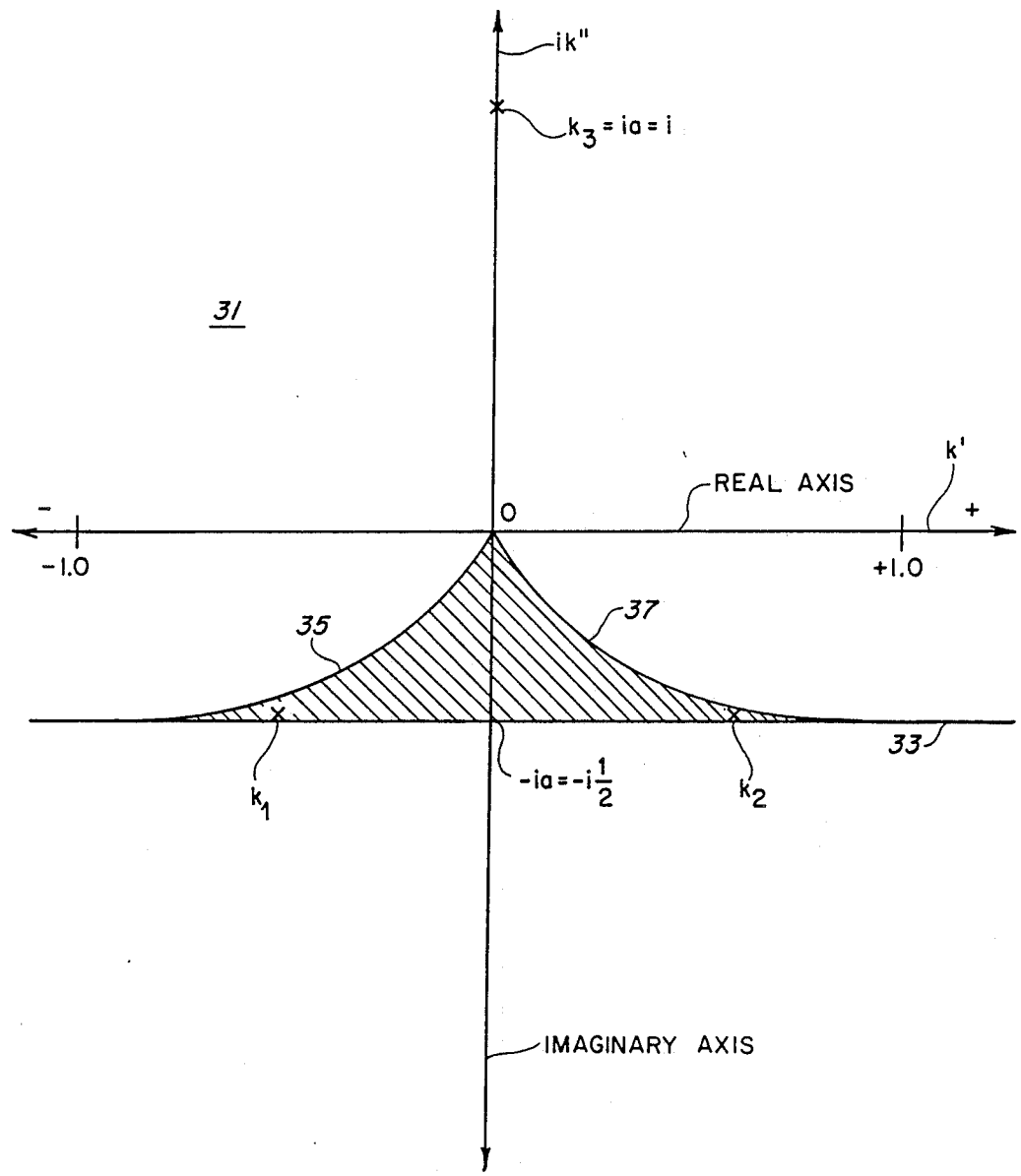
FIG. 3 is a graphical view of a complex wave number k-plane illustrating the horizontal real axis and the vertical imaginary axis and further illustrating the pole locations of the three-pole rational function representing the transverse reflection coefficient r(k).

Rational function approximations for representing scattering data have found many applications in electronic networks (see, for example, *Introduction to Modern Network Synthesis*, M. E. van Valkenberg, New York, J. Wiley and Sons, 1960). The novel algorithmic procedure of this invention uses rational functions of the wave number k to represent the appropriate scattering data required for the accurate design of optical waveguides, namely the transverse reflection coefficient of a waveguide. These rational functions can, in general, assume many different forms, depending upon the specific optical system and waveguide to be constructed. Here the general method of this invention will be demonstrated by a reasonably simple example that contains all the relevant features of the invention. To this end, an example will be demonstrated using a three-pole rational function of the transverse wave number k where one pole on the upper imaginary axis of the complex k-plane, as shown in FIG. 3, characterizes the single propagating mode of the waveguide while two symmetric poles in the lower half of the complex k-plane characterize the radiating modes thereof. The generalized three-pole non-zero transverse reflection coefficient can be written as $$r(k) = \frac{r_0}{(k - k_1)(k - k_2)(k - k_3)}.$$

The two symmetric poles in the lower half k-plane are $k_1 = -c_1 - ic_2$ and $k_2 = c_1 - ic_2$ (so that $k_2$ is the negative complex conjugate of $k_1$) and characterize the radiation modes. The third pole on the positive imaginary k-axis is $k_3 ia$ and characterizes the single propagating mode.

Figure 6:
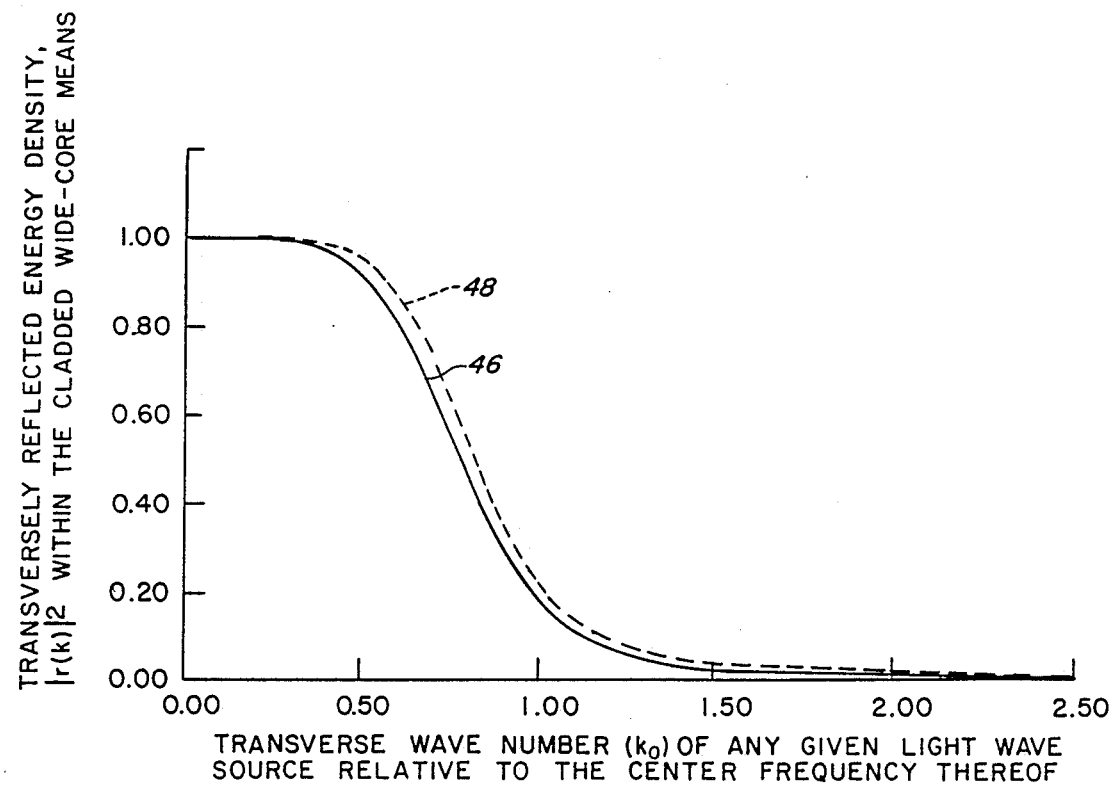
FIG. 6 is still another graphical view of two curves in dotted and solid lines where one curve is the perturbation of the other and illustrates for either curve the analytically determined transversely reflected energy density of the waveguide core means versus the transverse wave number of any single-mode light wave source being transmitted (propagated and radiated) by the waveguide core means.

The transverse wave-number k is related to the light-source wave-number $k_0$ and the longitudinal propagating wave-number $\beta$ by $$k_0^2 k^2 \beta^2$$

so that k=0 corresponds to the ideal case where the propagating wave number in the waveguide matches the wave number of the light source. As shown in FIG. 6, this corresponds to the ideal case where the light is contained only in the propagating mode $|r(k)|^2 1.0$ at k=0. This invention significantly improves the design of optical waveguides by using a more realistic design that includes radiating modes as well as propagating modes. As will be seen, this leads to a core means design that has significantly enhanced capabilities. The transverse wave number k is here considered to be measured relative to the center frequency of the laser or other light source, i.e. for the present discussion the center frequency corresponds to k=0. Also, as is common in engineering practice, the physical variable k is mathematically extended to be a complex variable having a real part k' and an imaginary part ik", where $i = \sqrt{-1}$, so that k=k'+ik", which can be used to construct a geometric representation in the form of the complex k-plane, where the horizontal axis represents k' and the vertical axis represents ik". The magnitude of the transverse reflection coefficient r(k) will in general be a maximum at the center frequency, i.e. $|r(k)|^2 = 1$, at k=0 and decreases as k increases. In the rational function given above the normalization constant $r_0$ is chosen so that $r_0 = r(k=0) = -1$; for this example it is $r_0 = k_1 k_2 k_3$. The pole values, $k_1, k_2, k_3$, in the complex k-plane are chosen so that $$|r(k)|^2 \leq 1$$

for all real k. This condition, which states in mathematical terms the condition for conservation of energy for the transverse reflection coefficient, limits the possible pole values for r(k) to certain "allowed regions" in the complex k-plane. The allowed regions for this three-pole example are shown by the cross-hatched regions in FIG. 3. The transverse reflection coefficient given above as well as derivations of the allowed regions and the equivalent quantum potential function have been discussed by the inventors, in the article, "An inverse scattering theory applied to the design of single-mode planar optical waveguides: study of discrete and continuous spectra", as published in July, 1988 in a book entitled *Some Topics on Inverse Problems* and edited by P. C. Sabatier, by publisher World Scientific of Singapore; New Jersey, U.S.A. and Hong Kong, pages 404–415 thereof; and also in the article, "Design of wide-core planar waveguides by an inverse scattering method" in the Apr. 15, 1989 issue of the journal *Optics Letters* which is published by the Optical Society of America, pages 411–413 thereof.

Figure 4:
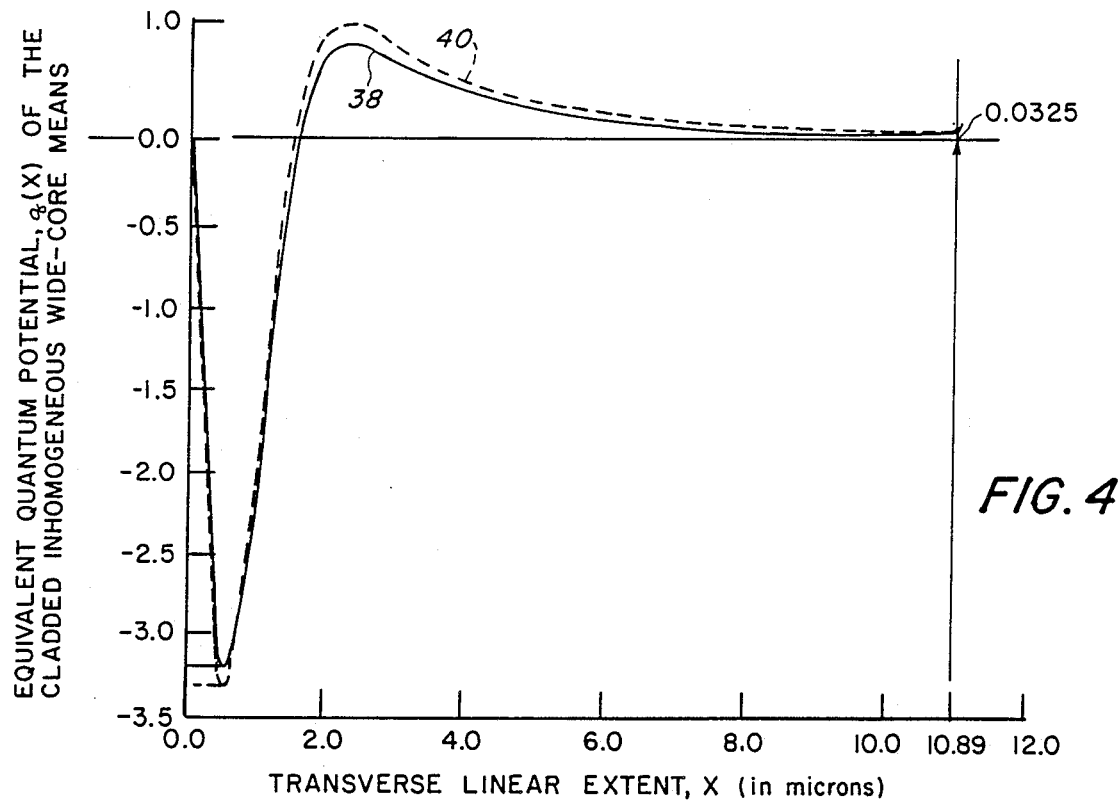
FIG. 4 is a graphical view of two inhomogeneous equivalent quantum potential curves in solid and dotted lines for the cladded wide core of a given waveguide of the invention where one curve is in effect the perturbation of the other and illustrates the relationship of either curve to a linear dimension as well as further illustrates the analogy between quantum mechanics and optical waveguides.

It is readily evident from the articles that the equivalent potential function $$q(x) = 2 \frac{d}{dx} K(x, x) = 2 \frac{d}{dx} [a^T(x) A^{-1}(x) b],$$

becomes after differentiation, $$q(x) = 2[a'^T(x) - a^T(x) A^{-1}(x) A'(x)] A^{-1}(x) b,$$

where $a'^T$ is the first derivative of $a^T$ with respect to x and A' is the first derivative of A with respect to x, where A is a six-by-six matrix as specified hereinafter and $A^{-1}$ is the inverse of A, where $a^T$ is a transposed columnar matrix having six terms; and where b is a columnar matrix also having six terms. The algorithmic equivalent potential function as specified above is of curvilinear shape and computer solvable. The terms a, b and A of the potential function are comprised of the pole values for r(k) given previously. Once the pole values have been assigned and after values of x up to and including the full core width, L, are selected, the potential function is computer-solvable and graphically-plottable, as shown in FIG. 4. For purposes of illustration, two potential curves 38 and 40 (solid and dotted lines) for slightly different pole value perturbations are depicted. In one reduction to practice the pole values of the dotted line potential curve were a=1.0, $c_1$=0.85 and $c_2$=0.499; for the solid line curve a=1.0, $c_1$=0.85 and $c_2$=0.4999. Also the wavelength ($\lambda$) of a given single-mode light wave was one and thirty hundredths (1.30) microns ($\mu$m).

Each potential curve in FIG. 4 has a U-shaped portion with negative values where x is less than about two or equal to zero and also has a concave-shaped tail portion of progressively decreasing negative slope that asymptotically approaches the zero potential value for any value of x that is greater than any x value for the U-shaped portion. It has been found that the minimum negative value of the potential for each curve can be used as a basis for selectively truncating the tail portion of each curve in order to determine the width of the waveguide core means for effectively transmitting a single-mode light wave in accordance with the invention.

From the aforementioned Schrödinger-type equation it can be shown that $$\epsilon(x) = \epsilon_2 - \frac{2(\epsilon_1 - \epsilon_2)}{\nu^2} [q(x)],$$

where $\epsilon(x)$ enables graphical construction of the permittivity profile of the waveguide core means in relation to a planar end face of the core means and for any value of x up to and including the full width L thereof, where q(x) is the equivalent quantum potential function, where $\epsilon_1$ is the maximum permittivity of the waveguide core means, where $\epsilon_2$ is the constant permittivity of the cladding means, and where V is the normalized frequency of the guide. The normalized frequency, V is given by $$V^2 k_0^2 L^2 (\epsilon_1 \epsilon_2),$$

where $k_0$ is the light-source wave number that is equal to $2\pi/\lambda$ and L is the full width of the waveguide core means. Thus, the permittivity profile has been determined to be $$\epsilon_1 = \max\{\epsilon(x)\} = \epsilon_2 - \frac{\epsilon_1 - \epsilon_2}{V^2} \max\{\hat{q}(\hat{x})\}$$

From the above equation for $\hat{\epsilon}(\hat{x})$, the V value and the width L can be determined as follows. Since the maximum value of $\epsilon(x)$ is equal to $\epsilon_1$, we have $$\epsilon(x) = \epsilon_2 - 2 \frac{(\epsilon_1 - \epsilon_2)}{V^2} [a'^T(x) A^{-1}(x) A'(x)] A^{-1}(x) b.$$

Here we use the notation q(x) since q and x are normalized with respect to the parameter L, which will now be determined:

$$\hat{q}(\hat{x}) = L^2 q(xL).$$

Since the maximum value of $\epsilon(x)$ occurs at the maximum negative value of q(x), which is $q_{-max}$, we have $$V^2 = L^2 q_{-max}$$

It is known that titanium-diffused lithium niobate has a relatively permittivity difference of $\delta = (\epsilon_1 - \epsilon_2)/2\epsilon_1 = 0.0089$, so that for the cladding $\epsilon_2 = 4.9333$, we find $\epsilon_1 = 5.0227$. The maximum of the potential curve occurs at about 0.60 where $q_{-max} = 3.3540$. Thus $V^2 = 51.01434$ and $V = 7.1439$; 1% of $q_{-max}$ is about 0.0335, where $x = L$. Thus L is calculated to be $$L = \frac{V\lambda}{2\pi(\epsilon_1 - \epsilon_2)^{\frac{1}{2}}} = \frac{7.1439 \times 1.30 \times 10^{-6}}{2\pi(5.0227 - 4.9333)^{\frac{1}{2}}}$$

$$= 4.9435 \times 10^{-6} \text{ m} = 4.9435 \text{ microns.}$$

In view of the foregoing for determining the width of the core means by use of the aforementioned algorithm in conjunction with given pole means and light source wavelength, the algorithmic permittivity profile of the waveguide core means can now be determined for a given light-source wavelength and a preselected waveguide material. The full width of the waveguide core means has been obtained by the selective truncation of the potential curves in FIG. 4 as aforedescribed. $\epsilon_2$ for cladding means 32 is 4.9333 where the preselected cladding material is $LiNbO_3$ and the selected light source wavelength $\lambda$ is 1.30 μm. Accordingly, the $\epsilon(x)$ permittivity equation as specified above is now solvable for $\epsilon(x) = \epsilon_1$. Once $\epsilon_1$ is determined then $\epsilon(x)$ is solvable for any value less than $\epsilon_1$.

Figure 5:
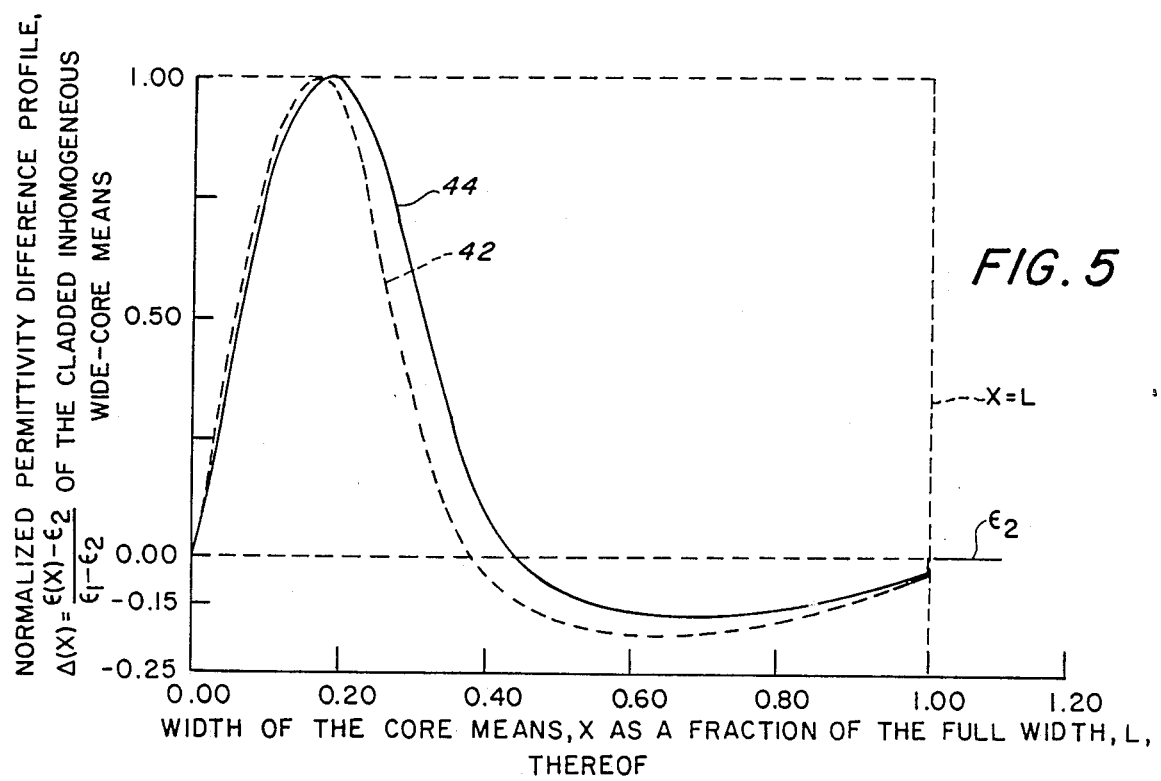
FIG. 5 is another graphical view of two curves in solid and dotted lines where one curve is the perturbation of the other and further illustrates either curve as a normalized permittivity difference profile of the waveguide inhomogeneous core means versus its transverse distance or width.

With this in mind, reference is made to FIG. 5, where the normalized permittivity difference profile, $$\Delta(x) = \frac{\epsilon(x) - \epsilon_2}{\epsilon_1 - \epsilon_2} = -\frac{2}{V^2} q(x),$$

is plotted in relation to the transverse distance x of the inhomogeneous core means up to and including its full width L. From this formula it is seen that when the permittivity profile $\epsilon(x)$ is at its maximum $\epsilon_1$, then $\Delta(x) = 1$, and also that the normalized permittivity difference profile is proportional to the equivalent quantum potential of the inhomogenous wide-core means. Accordingly, as is evident in FIG. 5, a graphical plot of $\Delta(x)$ in relation to the core means width x is of asymmetrical and curvilinear shape for both the solid and dotted line curves. The shape of either curve consists of an inverted U-shaped portion and a tail portion of concave shape. The relative permittivity $\Delta(x)$ is negative in the tail portion. This negative portion of the $\Delta(x)$ curve is known as "depressed cladding." Since the tail portion asymptotically approaches the horizontal line where $\Delta(x)$ equals 0 the tail portion is selectively truncated at the corresponding value of x for which the potential q(x) is 1% (=0.01) of the maximum value of q as discussed previously. This depressed cladding effect has been advantageously considered in designing the cladded wide-core means of the invention. One of the advantages of this effect is that it minimizes the mechanical stress at the interface between the core means and at least one of the cladding means. Moreover, this effect also diminishes multimode dispersion in the optical waveguide. In other words, if the relative permittivity profile of the cladded waveguide is entirely graphically positive, excessive stressing and multimode dispersion would occur.

Although not heretofore specified, the transposed columnar matrix term $a^T$ is $$a^T(x) = [1 x e^{\eta_1 x} e^{-\eta_1 x} e^\eta$$
$$2 x e^{-\eta_2 x}],$$

where $$\eta_1 = [(\sigma + \rho)/2]^{\frac{1}{2}}, \eta_2 = [(\sigma - \rho)/2]^{\frac{1}{2}},$$

and where $$\sigma = a^2 + 2c_2^2 - 2c_1^2, \rho = \sqrt{(a^2 - 4c_2^2)(a^2 + 4c_1^2)}.$$

Also, the b columnar matrix term is written in transposed form is equal to $$b^T = [0\ 0\ 0\ 0\ 0\ -a(c_1^2 + c_2^2)].$$

$$\begin{bmatrix} 0 & 1 & 0 & 0 & 0 & 0 \\ 0 & 0 & f(\eta_1) & a(c_1^2 + c_2^2) & 0 & 0 \\ 0 & 0 & 0 & 0 & f(\eta_2) & a(c_1^2 + c_2^2) \\ 1 & -x & e^{-\eta_1 x} & e^{\eta_1 x} & e^{-\eta_2 x} & e^{\eta_2 x} \\ 1 & -1 & -\eta_1 e^{-\eta_1 x} & \eta_1 e^{\eta_1 x} & -\eta_2 e^{-\eta_2 x} & \eta_2 e^{\eta_2 x} \\ 0 & 0 & \eta_1^2 e^{-\eta_1 x} & \eta_1^2 e^{\eta_1 x} & \eta_2^2 e^{-\eta_2 x} & \eta_2^2 e^{\eta_2 x} \end{bmatrix}$$

where $$f(\eta) = \eta^3 + (2c_2 - a)\eta^2 + [(c_1^2) - 2ac_2]\eta - a(c_1^2 + c_2^2),$$

with f(η) being equal to $f(\eta_1)$ or $f(\eta_2)$, as required in the above matrix. In the above six-by-six matrix, e is generally known constant having the approximate value 2.718. In the view of the foregoing, it is evident that for any value of x up to the full core width L, the algorithmic potential function and algorithmic permittivity profile function primarily involve assigned pole values in solving them, such as by appropriate computer techniques.

As further evident in FIG. 6, solid and dotted line curves are plotted for transversely reflected energy density versus transverse wave number for any waveguide 16 used in accordance with the invention. In other words, when the transverse reflected energy density $|r(k)|^2$ was assumed to be zero for $k>0$, as in prior use, there were only propagating modes, but in this novel and unique improvement there are both radiating and propagating mode so that $|r(k)|^2$ is not equal to zero. In the uniquely designed waveguide of this invention with its inhomogeneous core that provides a normalized permittivity difference profile with a positive inverted portion for radiating and propagating modes but also a negative tail portion having a depressed cladding region in effect, especially at a core-cladding interface of the waveguide, which reduces internal mechanical stress due to the gradient of dopant concentration and also reduces multimode dispersion.

The three-pole reflection coefficient used above is a generic example and this algorithmic design procedure can be applied to more general pole and zero configurations for the reflection coefficient or other appropriate function, contingent upon the specific system application. This algorithmic design procedure can be used with other general rational function representations of the nonzero transverse reflection coefficient so as to provide a more accurate and realistic waveguide design for both radiating and propagating modes of the nonzero transverse reflection coefficient.

It is also noted here that the formulas aforediscussed for permittivity profile $\epsilon(x)$ or $\Delta(x)$ that the refractive index for any x value of the core means is proportional to the square root of the relative permittivity $\epsilon$ at that same x value of either one of these formulas.

Obviously many modifications and variations of the present invention are possible in light of the above teachings. It is therefore to be understood that, within the scope of the appended claims, the invention may be practiced otherwise then as specifically described.

What is claimed and desired to be secured by letters patent of the United States is:

1. An optical wide-core planar waveguide for transmitting a single mode light wave source of preselected normalized frequency comprising:
   inhomogeneous wide-core means of generally block-like solid-shaped configuration, the core means having one set of opposed sides and one set of opposed ends all of which are interconnected and also having transverse reflection characteristics as well as enhanced confinement and improved modal structure characteristics,
   opposed cladding means for covering one set of opposed sides of the core means, each cladding means having a constant permittivity ($\epsilon$), the core means and the cladding means along at least one side of the core means having an interface therebetween,
   the core means and the cladding means along at least one side of the core means having an interface therebetween,
   the wide-core means having both a predetermined width and a predetermined permittivity profile where the predetermined width is determined by selectively truncating an equivalent inhomogeneous quantum potential curve, q(x) for single-mode light wave transmission in the core means and with the potential curve stemming from a mathematically-derived and computer-solved complex algorithmic function that involves a rational function representation of a nonzero transverse reflection coefficient having preselected multi-pole values, a normalized permittivity difference profile curve of the core means as the result of determining both the predetermined width and the permittivity profile $\epsilon(x)$ thereof indicating the transmission characteristics of a substantially uniform signal of a single-mode light wave source of preselected center frequency from one opposed end of the opposed ends of the core means and to the other opposed end thereof and to the opposed sides thereof where the permittivity profile $\epsilon(x)$ of the core means stems from another mathematically derived and computer solved complex algorithmic formula in relation to the preselected multi-pole values of the rational function representation of the nonzero transverse reflection coefficient in conjunction with any selected width value of the core means up to its predetermined width such that any value of $\epsilon(x)$ for a selected width value of the core means is greater than the constant permittivity $\epsilon_2$ of the cladding means,
   the normalized permittivity difference profile being of asymmetrical and curvilinear shape and having a
   - positive and inverted somewhat U-shaped portion and a positive sloped upwardly inclined negative tail portion that is connected to the inner end of the inverted U-shaped portion, and
   the outer end of the negative tail portion of the normalized permittivity difference profile of the core means asymptotically approaching $\epsilon_2$ as $\epsilon(x)$ approaches the predetermined width of the core means but the outer end is truncated in accordance with the predetermined width of the core means so as to form a depressed cladding effect at the interface at the one side of the core means between the core means and the cladding means where the truncation of the negative tail portion occurs.

2. A waveguide as set forth in claim 1 wherein the number of preselected multi-pole values is three, wherein one of the pole values is on the positive imaginary axis of the complex k-plane and represents the propagating mode through the core means, and wherein the other two pole values of the series are in the lower half of the complex k-plane and represent the radiating modes through the core means.

3. A waveguide as set forth in claim 1 wherein the inhomogeneous wide-core means can be essentially composed of titanium-diffused lithium niobate (Ti:LiNbO$_3$).

4. A waveguide as set forth in claim 1 wherein the extent of the truncation of the normalized permittivity difference profile for a core means of predetermined width is related to the truncation of the equivalent quantum potential q(x).

5. An optical communication system having a single mode light wave source, optical single mode planar wave guide and a receiver device, the source, waveguide and device all being disposed along the longitudinal axis of the system and arranged in spaced and operative relation to each other such that the receiver device receives a propagating mode of a light wave as transmitted by the waveguide when the single mode light wave source is a light wave output during system use, the improvement comprising:

the waveguide being generally made up of inhomogeneous wide-core means and opposed cladding means, the core means being generally of block-like and solid-shaped configuration and having transverse reflection characteristics as well as enhanced mode confinement and improved modal structure characteristics, the core means having one set of opposed sides and one set of opposed ends all of which are interconnected, either opposed end having an exposed planar face, the opposed cladding means for covering the opposed sides of the core means, each cladding means having a constant permittivity $\epsilon_2$, the core means and the cladding means along at least one side of the core means having an interface therebetween, the wide core means having both predetermined width and a predetermined permittivity profile where the predetermined width is determined by selectively truncating an equivalent inhomogeneous quantum potential curve $q(x)$ for single-mode light wave transmission in the core means and with the potential curve stemming from a mathematically-derived and computer-solved complex algorithmic function that involves a nonzero transverse reflection coefficient having preselected multi-pole values, a normalized permittivity difference profile curve of the core means being determined as the result of determining both the predetermined width of the core means and permittivity profile $e(x)$ thereof such that any value of $e(x)$ for a selected width value of the core means is greater than the constant permittivity $\epsilon_2$ of the cladding means, the permittivity profile thereof indicating transmission characteristics of a substantially uniform lightwave signal of the source of preselected center frequency from one opposed end of the core means to the other opposed end thereof as well as to the opposed sides thereof where the permittivity profile $\epsilon(x)$ stems from another mathematically derived and computer solved complex algorithmic formula in relation to the preselected multi-pole values in conjunction with any selected width value of the core means up to its predetermined width, the normalized permittivity difference profile being of asymmetrical and curvilinear shape and having a positive and inverted somewhat U-shaped portion and a positive sloped upwardly inclined negative tail portion that is connected to the inner end of the inverted U-shaped portion, and the outer end of the negative tail portion of the normalized permittivity difference profile of the core means asymptotically approaching $\epsilon_2$ as $e(x)$ approaches the predetermined width of the core means but the outer end of the tail portion being truncated in accordance with the predetermined width of the core means so as to form a depressed cladding effect at the interface at the one side of the core means between the core means and the cladding means where the truncation of the negative tail portion occurs.

6. A system as set forth in claim 5 wherein the core means is of composite and integrated construction.

7. A system as set forth in claim 5 wherein the source means is a coherent electromagnetic radiation source means.

8. A system as set forth in claim 5 wherein the source means is an incoherent electromagnetic radiation source means.

9. A system as set forth in claim 5 wherein the receiver device is modulating means.

10. A system as set forth in claim 5 wherein the receiver device is detecting means.

11. A method for analytically predetermining both the permittivity profile and width of the inhomogeneous wide-core means of a cladded optical single-mode wide-core planar waveguide for a single-mode light wave source where one set of opposed sides of the wide-core means are provided with opposed cladding means, and where one set of opposed ends of the core means are exposed and interconnected to the opposed sides, the method comprising the steps of:

preselecting the value of two or more poles of a rational multi-pole function to represent the nonzero transverse reflection coefficient of the wide core means of an optical single-mode wide-core planar waveguide such that the coefficient characterizes radiating and propagating modes of a single-mode light wave source through the wide core means of the optical planar waveguide;

repetitively analyzing a complex inhomogeneous equivalent quantum potential curve formula $q(x)$ for more than one value of x where the formula is based on the multi-pole function and the preselected value for each pole, and where any value of x for the formula corresponds to a locus point along the linear dimensional extent of the equivalent quantum potential curve and enables the determination of the nonlinear curvilinear shape of the equivalent quantum potential curve in relation to x, such that the curvilinear shape of the equivalent quantum potential curve is generally made up of a U-shaped portion having negative potential values for values of x greater than and equal to zero and a concave-shape tail portion having positive potential values but progressively reducing negative slope values as the tail portion asymptotically approaches zero potential for increasing values of x that are greater than the x values for determining the U-shape portion, graphically plotting the equivalent quantum potential curve formula, $q(x)$, in relation to more than one x value so as to indicate the curvilinear shape of the quantum potential;

selectively truncating the curvilinear tail portion of the graphically plotted potential curve at a predetermined point of the tail portion where a value of the potential curve at the predetermined point for a coordinate value of x is approximately one percent (1%) of the maximum negative potential of the U-shaped portion for another value of x, predetermining the width of the planar waveguide where such width substantially corresponds to the value of x at the predetermined point where the graphically plotted tail portion has been truncated, also repetitively analyzing the permittivity profile formula $\epsilon(x)$ of the core means in relation to the value of two or more poles of the rational function of the nonzero transverse reflection coefficient in conjunction with any width value of the core means up to its predetermined width, and then repetitively analyzing the normalized permittivity profile curve formula $\Delta(x)$ of the core means to indicate the transmission characteristics of a substantially uniform signal of a single mode light wave source of preselected center frequency from one opposed end of the core means to the other opposed end thereof and to the opposed sides thereof.

12. A method as set forth in claim 11 wherein the step of repetitively analyzing the potential curve formula is effected by a mathematically derived and computer-solved complex algorithmic function.

13. The method as set forth in claim 11 wherein the step of repetitively analyzing the permittivity profile curve formula is effected by another mathematically derived and computer-solved complex algorithmic function.

14. A method as set forth in claim 11 wherein the nonzero transverse reflection coefficient, r(k), is equal to the multi-pole rational function r(k) having the following terms:

$$\frac{r_0}{(k-k_1)(k-k_2)(k-k_3)}$$

where the function r(k) takes into account both propagating modes and radiating modes through the core means so that the normalized permittivity difference profile of the core means is made up of an asymmetrical curvilinear shape having a tail portion that defines a negative region at the interface between one side of the core means and its associated cladding means so as to form a depressed cladding effect therebetween.

15. A method as set forth in claim 14 wherein the term $r_o$ represents the value of the nonzero transverse reflection coefficient r(k) at the center frequency of the waveguide, i.e. k=0, so that $r_o$ has the terms $k_1$, $k_2$, $k_3$ which represent the poles located in the complex k-plane; wherein the poles $k_1$ and $k_2$ are symmetrically placed in the lower half of the k-plane with respect to the vertical imaginary k-axis thereof, have preselected values and represent the radiating modes of the core means; wherein the pole $k_3$ is located on the upper positive imaginary k-axis of the k-plane, has a preselected value and represents the single propagating mode of the core means; and wherein $r_o$ is equal to r(k=0) which is equal to minus one and for this embodiment $r_o$ is also equal to $k_1 k_2 k_3$.

16. An optical wide-core planar waveguide for transmitting a single mode light wave source of preselected normalized frequency comprising:

inhomogeneous wide-core means of generally block-like solid-shaped configuration, the core means having one set of opposed sides and one set of opposed ends all of which are interconnected and also having transverse reflection characteristics as well as enhanced mode confinement and modal structure characteristics, opposed cladding means for covering the one set of opposed sides of the core means, each cladding means having a constant permittivity $\epsilon_2$, and the wide-core means having a predetermined width and permittivity profile where the predetermined width is determined by selectively truncating an equivalent inhomogeneous quantum potential curve q(x) for single-mode light wave transmission in the core means and with the potential curve stemming from a mathematically-derived and computer-solved complex algorithmic function that involves a nonzero transverse reflection coefficient having preselected multi-pole values, a normalized permittivity difference profile curve of the core means as the result of determining the width and the permittivity profile e(x) thereof indicating the transmission characteristics of a substantially uniform signal of a single-mode light wave source of preselected center frequency from one opposed end of the core means to the other opposed end thereof and to the one set of the opposed sides thereof when the permittivity profile e(x) of the core means stems from another mathematically derived and computer solved complex algorithmic formula in relation to the preselected multi-pole values of a rational function representation of the nonzero transverse reflection coefficient in conjunction with any selected width value of the core means up to its predetermined width such that any value of e(x) for a selected width value of the core means is greater than the constant permittivity $\epsilon_2$ of the cladding means, the permittivity profile e(x) of the core means being $$\epsilon_2 - 2\frac{(\epsilon_1 - \epsilon_2)}{V^2}[a'^T(x) - a^T(x)A^{-1}(x)A'(x)]A^{-1}(x)b,$$

where $0 \leq x \leq 1$, where $\epsilon_1 > \epsilon_2$, where V is the normalized frequency of the wave given by $$V^2 = k_0^2 L^2(\epsilon_1 - \epsilon_2).$$

where $k_0$ is the light-source wave number that is equal to $2\pi/\lambda$, where L is the full width of the waveguide core means, where $a^T$ is a transposed columnar matrix function that is made up of a series of six terms, where a' is a first derivative of a with respect to x, where b is another columnar matrix function that is made up a of series of six terms, where A is a six-by-six matrix that is made up of thirty-six terms with $A^{-1}$ being the inverse of A, with A' being the first derivative of A with respect to x and with $a^T$ being equal to $$a^T(x) = [1 x e^{\eta_1 x} e^{-\eta_1 x} e^{\eta_2 x} e^{-\eta_2 x}],$$

where x is the transverse distance in the core means, where e is a standard constant that is the base for Napierian logarithms (e=2.71828 ...) and where $\eta_1$ or $\eta_2$ is specified below, with $b^T$ being equal to $$b^T = [0 0 0 0 0 -a(c_1^2 + c_2^2)];$$

terms a, $c_1$, and $c_2$ having three reflection pole locations in the complex k-plane for the normalized frequency of the light wave; and A(x) being a six-by-six matrix;

$$\begin{bmatrix} 0 & 1 & 0 & 0 & 0 & 0 \\ 0 & 0 & f(\eta_1) & a(c_1^2 + c_2^2) & 0 & 0 \\ 0 & 0 & 0 & 0 & f(\eta_2) & a(c_1^2 + c_2^2) \\ 1 & -x & e^{-\eta_1 x} & e^{\eta_1 x} & e^{-\eta_2 x} & e^{\eta_2 x} \\ 1 & -1 & -\eta_1 e^{-\eta_1 x} & \eta_1 e^{\eta_1 x} & -\eta_2 e^{-\eta_2 x} & \eta_2 e^{\eta_2 x} \\ 0 & 0 & \eta_1^2 e^{-\eta_1 x} & \eta_1^2 e^{\eta_1 x} & \eta_2^2 e^{-\eta_2 x} & \eta_2^2 e^{\eta_2 x} \end{bmatrix}$$

where $$f(\eta)=\eta^3+(2c_2-a)\eta^2+[(c_1^2+c_2^2)-2ac_2]\eta-a(c_1^2+c_2^2),$$

where $$\eta_1=[(\sigma+\rho)/2]^{\frac{1}{2}},$$

where $$\eta_2=[(\sigma-\rho)/2]^{\frac{1}{2}},$$

with $f(\eta)=f(\eta_1)$ or $f(\eta_2)$ as required in the above matrix, and where $$\sigma = a^2 + 2c_2^2 - 2c_1^2, \text{ and } \rho = \sqrt{(a^2-4c_2^2)(a^2+4c_1^2)}.$$

17. An optical wide-core planar waveguide for transmitting a single mode light wave source of preselected normalized frequency comprising:
inhomogeneous wide-core means of generally block-like solid-shaped configuration, the core means having one set of opposed sides and one set of opposed ends all of which are interconnected and also having transverse reflection characteristics as well as enhanced mode confinement and modal structure characteristics,
opposed cladding means for covering the one set of opposed sides of the core means, each cladding means having a constant permittivity $\epsilon_2$, and
the wide-core means having a predetermined width and permittivity profile where the predetermined width is determined by selectively truncating an equivalent inhomogeneous quantum potential curve $q(x)$, for single-mode light wave transmission in the core means and with the potential curve stemming from a mathematically-derived and computer-solved complex algorithmic function that involves a rational function representation of a nonzero transverse reflection coefficient having preselected multi-pole values, a normalized permittivity difference profile curve of the core means as the result of determining both the predetermined width and the permittivity profile $\epsilon(x)$ thereof indicating the transmission characteristics of a substantially uniform signal of a single-mode light wave source of preselected center frequency from one opposed end of the opposed ends of the core means to the other opposed and thereof and to the one set of the opposed sides thereof where the permittivity profile $\epsilon(x)$ of the core means stems from another mathematically derived and computer solved complex algorithmic formula in relation to the preselected multi-pole values of a rational function representation of the nonzero transverse refection coefficient in conjunction with any selected width value of the core means up to its predetermined width such that any value of $\epsilon(x)$ for a selected width value of the core means is greater than the constant permittivity $\epsilon_2$ the cladding means, the permittivity profile $\epsilon(x)$ of the core means being $$\epsilon_2 - 2\frac{(\epsilon_1 - \epsilon_2)}{V^2}[a'^T(x) - a^T(x)A^{-1}(x)A'(x)]A^{-1}(x)b,$$

where $0 \leq x \leq 1$, $\epsilon_1 > \epsilon_2$, where V is the normalized frequency of the wave given by $$V^2 = k_0^2 L^2(\epsilon_1 - \epsilon_2),$$

where $k_0$ the light-source wave number that is equal to $2\pi/\lambda$, where L is the full width of the waveguide core means, where $a^T$ a transposed columnar matrix function that is made up of a series of six terms, where $a'$ is a first derivative with respect to z, where b is another columnar matrix function that is made up of a series of six terms, where A is a six-by-six matrix that is made up of thirty-six terms with $A^{-1}$ being the inverse of A, with $A'$ being the first derivative of A with respect to z and with $a^T$ being equal to $$a^T(x)=[1 \; x \; e^{\eta_1 z} e^{-\eta_1 z} e^{\eta_2 z} e^{-\eta_2 z}],$$

where x is the transverse distance in the core means, where e is a standard constant that is the base for Napierian logarithms (e=2.71828 . . . ), and where $n_1$ or $n_2$ is specified below, with $b^T$ being equal to $$b^T=[0000 - a(c_1^2+c_2^2)],$$

where the terms a, $c_1$ and $c_2$ being three reflectors pole locations in the complex k-plane for the normalized frequency of the light wave; and $A(x)$ being a six-by-six matrix:

$$\begin{bmatrix} 0 & 1 & 0 & 0 & 0 & 0 \\ 0 & 0 & f(\eta_1) & a(c_1^2+c_2^2) & 0 & 0 \\ 0 & 0 & 0 & 0 & f(\eta_2) & a(c_1^2+c_2^2) \\ 1 & -x & e^{-\eta_1 x} & e^{\eta_1 x} & e^{-\eta_2 x} & e^{\eta_2 x} \\ 1 & -1 & -\eta_1 e^{-\eta_1 x} & \eta_1 e^{\eta_1 x} & -\eta_2 e^{-\eta_2 x} & \eta_2 e^{\eta_2 x} \\ 0 & 0 & \eta_1^2 e^{-\eta_1 x} & \eta_1^2 e^{\eta_1 x} & \eta_2^2 e^{-\eta_2 x} & \eta_2^2 e^{\eta_2 x} \end{bmatrix}$$

where $$f(\eta)=\eta^3+(2c_2-a)\eta^2+[(c_1^2+c_2^2)-2ac_2]\eta-a(c_1^2+c_2^2),$$

where $$\eta_1=[(\sigma+\rho)/2]^{\frac{1}{2}},$$

where
$$\eta_2=[(\sigma-\rho)/2]^{\frac{1}{2}},$$

with $f(\eta)=f(\eta_1)$ or $f(\eta_2)$ as required in the above matrix, and where $$\sigma = a^2 + 2c_2^2 - 2c_1^2, \text{ and } \rho = \sqrt{(a^2-4c_2^2)(a^2+4c_1^2)},$$

with the predetermined width, L, of the wide-core means being a function of $$\frac{V}{k_0\sqrt{\epsilon_1 - \epsilon_2}}$$

where $k_0$ is the light-source wave number that is equal to $2\lambda$ with $\lambda$ being the wavelength, where V is the normalized or center frequency of a single-mode light wave source in Hertz per second, and where $\epsilon_1$ is the maximum value of $\epsilon(x)$ for a given core means.

18. A method for analytically predetermining the permittivity profile and width of the inhomogeneous wide-core means of a cladded optical single-mode optical single-mode wide-core planar waveguide for a light wave where one set of opposed sides of the wide-core means are provided with opposed cladding means, the method comprising the steps of:

preselecting the value of two or more poles of a rational multi-pole function to represent the nonzero transverse reflection coefficient of the wide core means of an optical single-mode wide-core planar waveguide such that the coefficient characterizes radiating and propagating modes of a single-mode light wave through the wide core means of the optical planar waveguide, repetitively analyzing a complex inhomogeneous equivalent quantum potential formula q(x) for more than one value of x where the formula is based on the multi-pole function and the preselected value for each pole, and where any value of x for the formula corresponds to a locus point along the linear dimensional extent of the equivalent quantum potential in relation to x; such that the curvilinear shape of the equivalent quantum potential is generally made up of an U-shaped portion having negative potential values for values of x greater than and equal to zero and a concave-shaped tail portion having positive potential values but progressively reducing negative slope values as the tail portion asymptotically zero potential for increasing values of x that are greater than the x values for determining the U-shaped portion, gradually plotting the equivalent quantum potential formula q(x) in relation to more than one x value so as to indicate the curvilinear shape of the quantum potential, selectively truncating the curvilinear tail portion of the graphically plotted potential at a predetermined point of the tail portion where a value of the potential at the predetermined point for a coordinate value of x is approximately one percent (1%) of the maximum negative potential of the U-shaped portion for another value of x, and predetermining the width of a planar waveguide where such width substantially corresponds to the value of x at the predetermined point where the graphically plotted tail portion has been truncated, and the equivalent quantum potential q(x) of the wide core of the waveguide being equal to:

$$2[a'^T(x) - a^T(x)A^{-1}(x)]A^{-1}(x)b,$$

where the columnar matrix a(x) is made up of the following terms and transported as designated by $a^T$ as follows:

$$a^T(x) = ]1xe^{\eta 1z}e^{-\eta 1z}e^{\eta 2z}e^{-\eta 2z}],$$

where $a'^T(x)$ is transposed and the first derivative of $a^T$ with respect to x, where A(z) is a six-by six matrix, where $A^{-1}$ is the inverse value of A, where A' is the first derivative of A with respect to x; and where b is a columnar matrix and is written in transposed form as $$b^T = [00000 - a(c_1^2 + c_2^2)].$$

19. A method for analytically predetermining the permitivity profile and width of the inhomogeneous wide-core means of a cladded optical single-mode wide-core planar waveguide for a light wave one set of opposed sides of the wide-core means are provided with opposed cladding means, the method comprising the steps of:

preselecting the value of two or more poles of a rational multi-pole function to represent the nonzero transverse reflection coefficient of the wide core means of an optical single-mode wide-core planar wavelength such that the coefficient characterizes radiating and propagating modes of a single-mode light wave through the wide core means of the optical planar waveguide, repetitively analyzing a complex inhomogeneous equivalent quantum potential formula q(x) for more than one value of x where the formula is based on the multi-pole function and the preselected value for each pole, and where any value of x for the formula corresponds to a locus point along the linear dimensional extent of the equivalent quantum potential in relation to x; such that the curvilinear shape of the equivalent quantum potential is generally made up of a U-shaped portion having negative potential values of x greater than and equal to zero and a concave-shaped tail portion having positive potential values but progressively reducing negative slope values as the tail portion asymptotically approaches zero potential for increasing values of x that are greater than the x values for determining the U-shaped portion, graphically plotting the equivalent quantum potential formula a(x) in relation to more than one x value so as to indicate the curvilinear shape of the quantum potential;

selectively truncating the curvilinear tail portion of the graphically plotted potential at a predetermined point of the tail portion where a value of the potential at the predetermined point for a coordinate value of x is approximately one percent 1% of the maximum negative potential of the U-shaped portion for another value of x, and predetermining the width of a planar waveguide where such width substantially corresponds to the value of x at the predetermined point where the graphically plotted tail portion has been truncated, and the permittivity profile e(x) of the wide-core waveguide being equal to $$\epsilon_2 - 2\frac{(\epsilon_1 - \epsilon_2)}{V^2}[a'^T(x) - a^T(x)A^{-1}(x)A'(x)]A^{-1}(x)b,$$

where $\epsilon_1$ is the maximum refractive index value of the core means, where $\epsilon_2$ is the constant refractive index value of the cladding means, where $\epsilon_1$, is greater than $\epsilon_2$, where V is the normalized frequency of the waveguide, and where q(x) is the equivalent quantum potential.

20. A method for analytically predetermining the permittivity profile and width of the inhomogeneous wide-core means of a cladded optical single-mode wide-core planar waveguide for a light wave where one set of opposed sides of the wide-core means are provided with opposed cladding means, the method comprising the steps of:

preselecting the value of two or more poles of a rational multi-pole function to represent the nonzero transverse reflection coefficient of the wide core means of an optical single-mode wide-core planar waveguide such that the coefficient characterizes radiating and propagating modes of single-mode light wave through the wide core means of the optical planar waveguide, repetitively analyzing a complex inhomogeneous equivalent quantum potential formula q(x) for more than one value of x where the formula is based on the multi-pole function and the preselected value for each pole, and where any value of x for the formula corresponds to a locus point along the linear dimensional extent of the equivalent quantum potential and enables the determination of the nonlinear curvilinear shape of the equivalent quantum potential in relation to x; such that the curvilinear shape of the equivalent quantum potential is generally made up of a U-shaped portion having negative potential values for values of x greater than and equal to zero and a concave-shaped tail portion having positive potential values but progressively reducing negative slope values as the tail portion asymptotically approaches zero potential for increasing values of x that are greater than the x values for determining the U-shaped portion, graphically plotting the equivalent quantum potential formula q(x) in relation to more than one x value so as to indicate the curvilinear shape of the quantum potential, selectively truncating the curvilinear tail portion of the graphically plotted potential at a predetermined point of the tail portion where a value of the potential at the predetermined point for a coordinate value of x is approximately one percent 1% of the maximum negative potential of the U-shaped portion for another value of x, and predetermining the width of a planar waveguide where such width substantially corresponds to the value of x at the predetermined point where the graphically plotted tail portion has been truncated and the normalized frequency of the waveguide being $$V = \left[\frac{2\pi}{\lambda}\right] < \sqrt{\epsilon_1 - \epsilon_2}$$

where $\lambda$ is the wavelength of a given light-wave source; L is the predetermined width of the core means, $\epsilon_1$ being the maximum refractive index value of the core means, and $\epsilon_2$ the constant refractive index value of the cladding means.

21. A method for analytically predetermining the permittivity profile and width of the inhomogeneous wide-core means of a cladded optical single-mode wide-core planar waveguide for a light wave where one set of opposed sides of the wide-core means are provided with opposed cladding means, and where a core-cladding interface is provided between the core means and the cladding means on either side of the core means, the method comprising the steps of:

preselecting the value of two or more poles of a rational multi-pole function to represent the nonzero transverse reflection coefficient of the wide core means of an optical single-mode wide-core planar waveguide such that the coefficient characterized radiating and propagating modes of a single-mode light wave through the wide core means of the optical planar waveguide, repetitively analyzing a complex inhomogeneous equivalent quantum potential formula q(x) for more than one value of x where the formula is based on the multi-pole function and the preselected value for each pole, and where any value of x for the formula corresponds to a locus point along the linear dimensional extent of the equivalent quantum potential and enables the determination of the nonlinear curvilinear shape of the equivalent quantum potential in relation to x; such that the curvilinear shape of the equivalent quantum potential is generally made up of a U-shaped portion having negative potential values for values of x greater than and equal to zero and a concave-shaped tail portion having positive potential values but progressively reducing negative slope values as the tail portion asymptotically approaches zero potential for increasing values of x that are greater than the x values for determining the U-shaped portion, graphically plotting the equivalent potential formula q(z) in relation to more than one x value so as to indicate the curvilinear shape of the quantum potential, selectively truncating the curvilinear tail portion of the graphically plotted potential at a predetermined point of the tail portion where a value of the potential at the predetermined point for a coordinate value of x is approximately one percent 1% of the maximum negative potential of the U-shaped portion for another value of x, and predetermining the width of a planar waveguide where such width substantially corresponds to the value of x at the predetermined point where the graphically plotted tail portion has been truncated, and the nonzero transverse reflection coefficient, r(k), being equal to the multi-pole rational function r(k) having the following terms:

$$\frac{r_0}{(k - k_1)(k - k_2)(k - k_3)}$$

where the function r(k) takes into account both propagating modes and radiating modes through the core means so that the normalized permittivity difference profile of the core means is made up of an asymmetrical curvilinear shape having a negative tail portion that defines a depressed cladding region at a core-cladding interface between the core means and one of the cladding means.

22. A method for analytically predetermining the permittivity profile and width of the inhomogeneous wide-core means of a cladded optical single-mode wide-core planar waveguides for a light wave where one set of opposed sides of the wide-core means are provided with opposed cladding means and where a core-cladding interface is provided between the core means and the cladding means on either side of the core means, the methods comprising the steps of:

preselecting the value of two or more poles of a rational multi-pole function to represent the nonzero transverse reflection coefficient of the wide-core means of an optical single-mode wide-core planar waveguides such that the coefficient characterizes radiating and propagating modes of a single-mode light wave through the wide core means of the optical planar waveguide, repetitively analyzing a complex inhomogeneous equivalent quantum potential formula q(x) for more than one value of x where the formula is based on the multi-pole function and the preselected value for each pole, and where any value of x for the formula corresponds to a locus point along the linear dimensional extent of the equivalent quantum potential and enables the determination of the nonlinear curvilinear shape of the equivalent quantum potential in relation of x; such that the curvilinear shape of the equivalent quantum potential is generally made up of a U-shaped portion having negative potential values but progressively reducing negative slope values as the tail portion asymptotically approaches zero potential for increasing values of x that are greater than the x values for determining the U-shaped portion, graphically plotting the equivalent quantum potential formula q(x) in relation to more than one x value so as to indicate the curvilinear shape of the quantum potential, selectively truncating the curvilinear tail portion of the graphically plotted potential at a predetermined point of the tail portion where a value of the potential at the predetermined point for a coordinate value of x is approximately one percent 1% of the maximum negative potential of the U-shaped portion for another value of x, and predetermining the width of a planar waveguide where such width substantially corresponds to the value of x at the predetermined point where the graphically plotted tail portion has been truncated, the nonzero transverse reflection coefficient, r(k) being equal to the multi-pole rational function r(k) having the following terms:

$$\frac{r_0}{(k - k_1)(k - k_2)(k - k_3)}$$

where the function r(k) takes into account both propagating modes and radiating modes through the core means so that the normalized permittivity difference profile of the core means is made up of an asymmetrical curvilinear shape having a tail portion that defines a depresses cladding region at a core-cladding interface between the core means and one of the cladding means, the term $r_0$ representing the value of the nonzero transverse reflection coefficient r(k) at the center frequency of the waveguide, i.e., k=0, so that $r_0$ has the terms $k_1$, $k_2$, and $k_3$ which represent the poles located in the complex k-plane; the poles $k_1$ and $k_2$ being symmetrically placed in the lower half of the k-plane with respect to the vertical imaginary k-axis and having preselected values that represent the radiating modes of the core means, and the pole $k_3$ being located on the upper positive imaginary k-axis of the k-plane and having a preselected value that represents the single propagating mode of the core means.

23. A method for analytically predetermining the permittivity profile and width of the inhomogeneous wide-core mean of a cladded optical signal-mode wide-core planar waveguide for a light wave where one set of opposed sides of the wide-core means are provided with opposed cladding means; and where a core-cladding interface is provided between the core means and the cladding means on either side of the core means, the method comprising the steps of:

preselecting the value of two or more poles of a rational multi-pole function to represent the nonzero transverse reflection coefficient of the wide core means of an optical single-mode wide-core planar waveguide such that the coefficient characterizes radiating and propagating modes of a single-mode light wave through the wide core means of the optical planar waveguide, repetitively analyzing a complex inhomogeneous equivalent quantum potential formula q(x) for more than one value of x where the formula as based on the multi-pole function and the preselected value for each pole, and where any value of x for the formula corresponds to a locus point along the linear dimensional extent of the equivalent quantum potential and enables the determination of the nonlinear curvilinear shape of the equivalent quantum potential in relation to x, such that the curvilinear shape of the equivalent quantum potential is generally made up of a U-shaped portion having negative potential values for values of x greater than and equal to zero and a concave-shaped tail portion having positive potential values but progressively reducing negative slope values as the tail portion asymptotically approaches zero potential for increasing values of x that are greater than the x values for determining the U-shaped portion, graphically plotting the equivalent quantum potential formula q(x) in relation to more than one x value so as to indicate the curvilinear shape of the quantum potential, selectively truncating the curvilinear tail portion of the graphically plotted potential at a predetermined point of the tail portion where a value of the potential at the predetermined point for a coordinate value of x is approximately one percent 1% of the maximum negative potential of the U-shaped portion for another value of x, and predetermining the width of a planar waveguide where such width substantially corresponds to the value of x at the predetermined point where the graphically plotted tail portion has been truncated, the nonzero transvers reflection coefficient, r(k) being equal to the multi-pole rational function r(k) having the following terms:

$$\frac{r_0}{(k - k_1)(k - k_2)(k - k_3)}$$

where the function r(k) takes into account both propagating modes and radiating modes though the core means so that the normalized permittivity difference profile of the core means is made up of an asymmetrical curvilinear shape having a negative tail portion that defines a depressed cladding region at a core-cladding interface between the core means and one of the cladding means, and the poles $k_1$, $k_2$ and $k_3$ being located in the k-plane so as to satisfy the energy-conservation condition where the absolute magnitude of the reflected energy density, $|r(k)^2|$, is less than or equal to one for all real values of k.

* * * * *